US011472549B2

(12) United States Patent
Taipale

(10) Patent No.: US 11,472,549 B2
(45) Date of Patent: Oct. 18, 2022

(54) AUTOMATIC LOCATION-BASED UAV MISSION PLAN LOADING

(71) Applicant: Sentera, Inc., Minneapolis, MN (US)

(72) Inventor: Eric Taipale, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 275 days.

(21) Appl. No.: 15/858,232

(22) Filed: Dec. 29, 2017

(65) Prior Publication Data

US 2019/0202555 A1 Jul. 4, 2019

(51) Int. Cl.
*B64C 39/02* (2006.01)
*G05D 1/02* (2020.01)
*G05D 1/00* (2006.01)
*G08G 5/00* (2006.01)
*G05D 1/10* (2006.01)

(52) U.S. Cl.
CPC ......... *B64C 39/024* (2013.01); *G05D 1/0088* (2013.01); *G05D 1/0202* (2013.01); *G05D 1/101* (2013.01); *G08G 5/006* (2013.01); *G08G 5/0013* (2013.01); *G08G 5/0026* (2013.01); *G08G 5/0034* (2013.01); *G08G 5/0069* (2013.01); *G08G 5/0082* (2013.01); *B64C 2201/127* (2013.01); *B64C 2201/146* (2013.01)

(58) Field of Classification Search
CPC ........ B64C 2201/141; B64C 2201/122; B64C 2201/06; B64C 39/024; G05D 1/0088
See application file for complete search history.

(56) References Cited

U.S. PATENT DOCUMENTS

| 2012/0237028 A1* | 9/2012 | Khazan | H04W 56/0045 380/201 |
| 2016/0216711 A1* | 7/2016 | Srivastava | G08G 5/045 |
| 2017/0097640 A1* | 4/2017 | Wang | G05D 1/0088 |
| 2017/0337824 A1* | 11/2017 | Chen | G05D 1/0202 |

* cited by examiner

*Primary Examiner* — James M McPherson
*Assistant Examiner* — Bakari Underwood
(74) *Attorney, Agent, or Firm* — Hamre, Schumann, Mueller & Larson, P.C.

(57) ABSTRACT

A method may include determining a location of an unmanned aerial vehicle (UAV); generating a set of mission plans based on the location of the UAV, each mission plan including respective mission plan parameters; receiving a selection of a mission plan of the set of mission plans; obtaining mission plan parameters for the selected mission plan; and transmitting the obtained mission plan parameters to the UAV to configure the UAV according to the obtained mission parameters.

16 Claims, 5 Drawing Sheets

US 11,472,549 B2

AUTOMATIC LOCATION-BASED UAV MISSION PLAN LOADING

BACKGROUND

Unmanned aerial vehicles (UAV) may be operated in a number of autonomous states—from manual to fully automated. In some instances, a UAV may be programmed to navigate through a series of waypoints defined by geographic coordinates. A controller may be communicatively coupled to the UAV to transmit the coordinates to the UAV. A user may use the controller to select the waypoints as part of a mission plan for the UAV.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

In the field of drone (e.g., UAVs) operations, a mission may be planned to execute autonomously or semi-autonomously. A mission may include take-off and landing points, intermediate waypoints, altitudes, and camera or other sensor payload commands that describe where and how specific data should be collected during the mission. A mission may be saved to a file (e.g., a mission plan) or other persistent storage mechanism, such as a database. Subsequently, the mission may be loaded so the same mission may be flown again. The use of a mission plan has many advantage including saving the time of manually planning a mission. Furthermore, the use of a mission plan helps ensure an identical mission is flown for the best comparison to data collected previously, and to increase safety by ensuring that pre-constrained mission trajectories and collection plans are executed.

Beyond just saving a mission plan, ensuring the correct mission plan is chosen may further reduce inaccurate data collection by an inadvertent selection of the wrong mission plan by a user. To help solve this problem, system and methods are described to reduce human involvement in selection of a mission plan. As described further herein, a controller of a UAV may generate a set of possible mission plans based on the location of the UAV—either by a sensor reading of the UAV or the controller. A user may then select one of the generated plans to utilize for the UAV.

Figure 1:
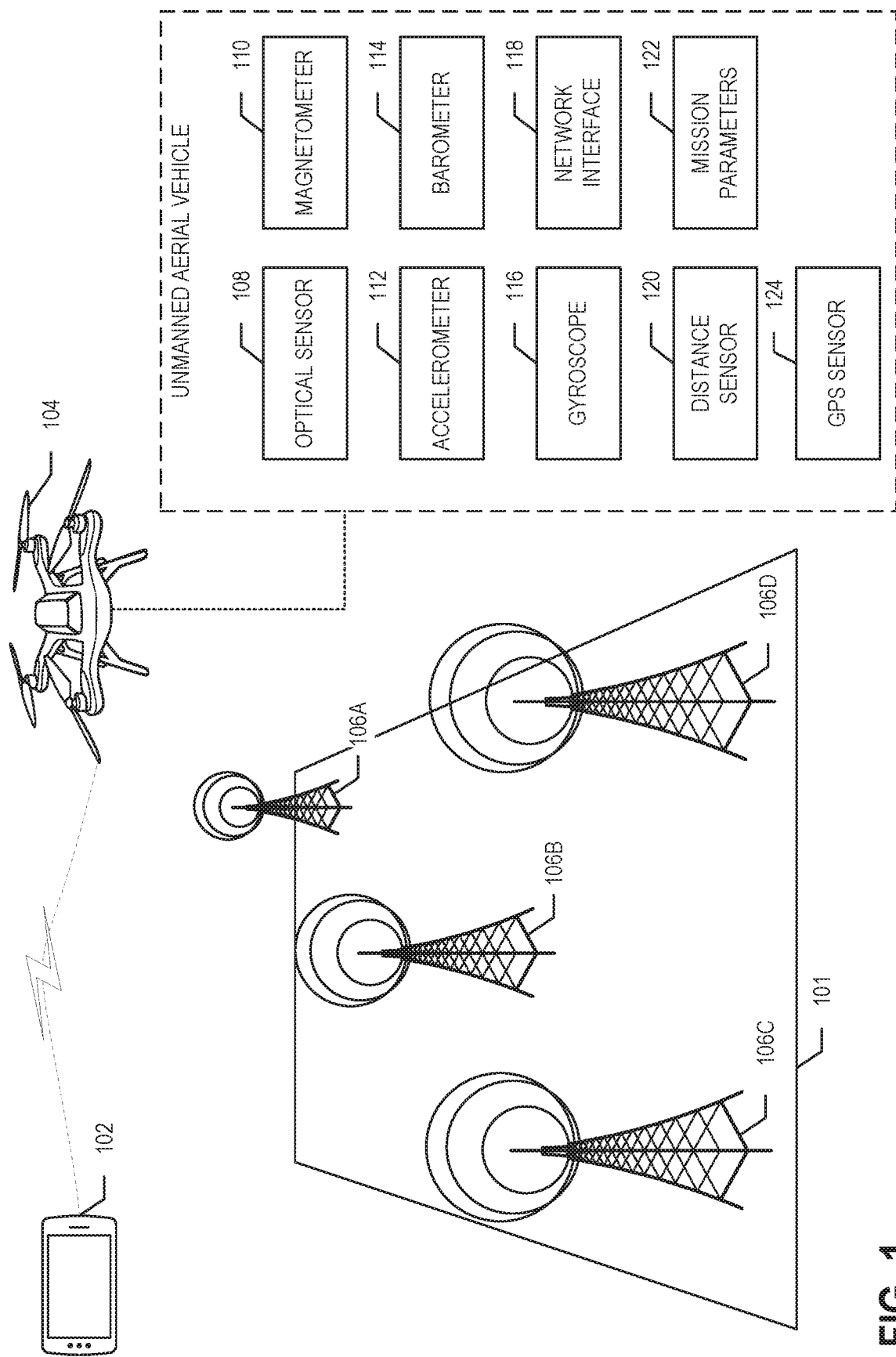
FIG. 1 is a visualization of an unmanned aerial vehicle (UAV) surveying a location, according to various examples.

FIG. 1 is a visualization of UAV 104 surveying a location 101, according to various examples. Location 101 includes assets 106A, 106B. 106C, 106D. Controller 102 is illustrated communicating with UAV 104. UAV 104 includes components: optical sensor 108, magnetometer 110, accelerometer 112, barometer 114, gyroscope 116, network interface 118, distance sensor 120, mission parameters 122, and GPS sensor 124.

It is understood that not all UAVs are required to have all the components illustrated in FIG. 1. Similarly, some UAVs have more than one of some of the components (e.g., network interface 118, distance sensor 120, optical sensor 108, etc.). Some of the components may have a general purpose of providing navigation for the UAV when put in an autonomous mode, but may also be used in semi-autonomous modes. For example, gyroscope 116 may be used to stabilize UAV 104 when UAV 104 is hovering—even if it is being controlled by a user with controller 102.

Controller 102 may communicate with UAV 104 via their respective network interfaces. In an example, controller 102 communicates over a 2.4 Ghz signal. Although not illustrated, controller 102 and UAV 104 may also be connected to other networks. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

A user may arrive at location 101 in order to perform inspections of an asset (e.g., asset 106A). Assets may be physical, human-made structures (e.g., as radio towers, buildings, farms, powerlines, etc.), land areas (e.g., as forests, farm fields, pastures, etc.), or naturally occurring formations (e.g., canyons, shorelines, etc.).

Figure 2:
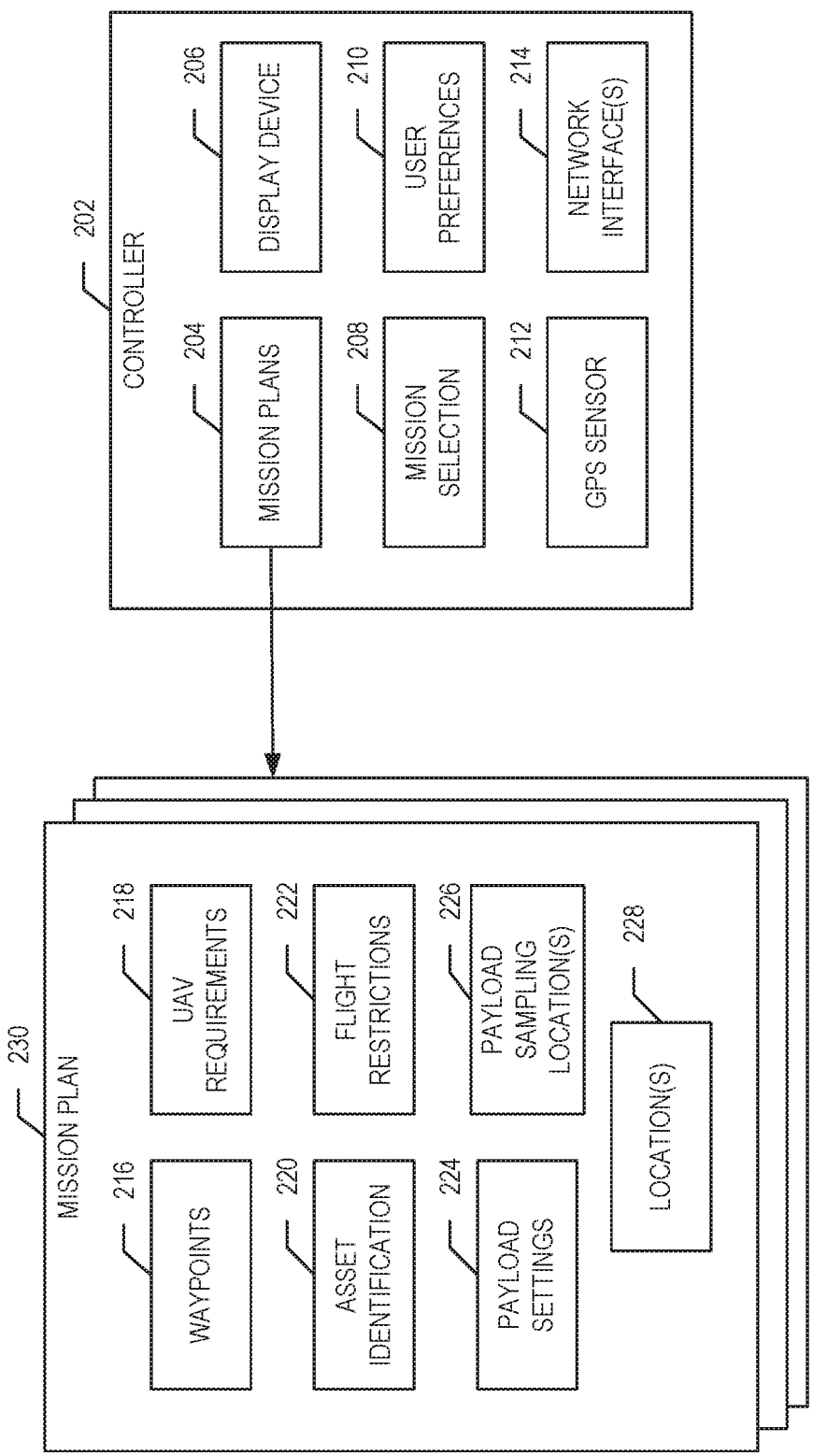
FIG. 2 illustrates a schematic view of a controller, according to various examples.

FIG. 2 illustrates a schematic view of controller 202, according to various examples. Controller 202 may include mission plans 204, display device 206, mission selection component 208, user preferences 210, GPS sensor 212, and network interface 214. A mission plan may include mission parameters 230: waypoints 216, UAV requirements 218, asset identification 220, flight restrictions 222, payload sensor settings 224, payload locations 226, and locations 228.

Controller 202 may be a mobile phone, a tablet, a stand-alone device with one or more joysticks, or a combination of the above (e.g. a stand-alone device using a tablet as a display). Controller 202 may be in communication with a UAV (e.g., UAV 104) in addition to other servers. These servers may provide data to controller 202 that may be relayed to UAV 104.

Data used by UAV 104 and controller 202 may be organized and stored in a variety of manners. For convenience, the organized collection of data is often described herein as a database (e.g., a data store). The specific storage layout and model used in a database may take a number of forms—indeed, a database may utilize multiple models. A database may be, but is not limited to, a relational database (e.g., SQL), non-relational database (NoSQL) a flat file database, object model, document details model, or a file system hierarchy. The database may store data on one or more storage devices (e.g., a hard disk, random access memory (RAM), etc.) of controller 202 or UAV 104. The storage devices may be in standalone arrays, part of one or more servers, and may be located in one or more geographic areas.

Display device 206 (e.g., a tablet display or external display) may present a user interface (UI) to a user in conjunction with controlling UAV 104. For example, the UI may present a video feed from an image sensor (e.g., a camera) on UAV 104. The UI may also display operational status of UAV 104 such as the altitude, speed, pitch, yaw, roll, etc., of UAV 104 based on readings from the onboard sensors of UAV 104.

Display device 206 may also present a UI for viewing, editing, storing, and selecting a mission plan for UAV 104. A mission plan may include a number of mission parameters. Some of mission parameters 230 may be used by UAV 104 for navigation, some to select the mission automatically based the location of UAV 104, and some may be used for data capture using onboard sensors of UAV 104. The navigation portion of a mission may be considered the flight plan.

User preferences 210 may store preference for a user regarding mission selection. The preferences may include a threshold distance to use for selecting possible mission plans. For example, a setting of 500 ft extending radial from the current location of a UAV or controller may be used. A user interface may be presented display device 206 for a user to view and select the threshold distance. User preferences 210 may also include preferences for selecting autonomous or semi-autonomous control of a UAV. This preference may be used to limit the number of mission plans selected by mission selection component 208

Waypoints 216 may identify an ordered or unordered set of geo-locations (e.g., GPS coordinates) that a UAV should fly to/through during a flight plan. A waypoint may be stored as a list of standardized data inputs such as [Latitude. Longitude. Flight Order, Altitude, Speed]. Other types of data structures may be used without departing from the scope of this disclosure. A flight plan may include a waypoint for the starting point (e.g., take-off point) and a waypoint for the ending point (e.g., landing point). In some examples, the starting point and ending point may be the same. Numerical values may be used for the "Flight Order" field of a waypoint in addition to special designations for take-off and landing points. For example, a 'SP' for "Flight Order" may signify the starting point and an 'EP' may signify the ending point (e.g., landing point). These labels are merely for illustration purposes and others may be used without departing from the scope of this disclosure.

UAV requirements 218 may identify the types of sensors (e.g., the payload) that are needed to adequately perform a mission. For example, one mission may be to take pictures of a radio tower, and thus requires an optical sensor. More specialized optical sensors may be needed when the mission involves inspecting vegetation health. Non-image sensors (e.g., radio frequency (RF) sensors, communications sensors, or sensors with active emitting components, such as lasers, RF transmitters, rangefinders) may also be required in some instances. UAV requirements 218 may also include an identification of a model of UAV as part of the requirements.

Asset identification 220 may identify the class (e.g., radio tower, field, etc.) of assets that are to be inspected during a mission. These may be useful when an area has multiple asset classes with their own mission plans. For example, while presenting a set of possible missions, the UI may include the assets that are to be inspected. In some examples, asset identification 220 may include a previously taken image of the asset during presentation. Asset identification 220 may also include the location of the assets that are inspected (or that should be avoided) during a mission.

Flight restrictions 222 may identify rules for the UAV while performing the mission. These rules may include speed, height, or time-of-day restrictions as well as areas that the UAV is not permitted at any height. Restrictions may be based on regulatory or privacy concerns. For example, it may be illegal to take pictures or obtain radiation readings in certain areas for certain asset classes (e.g., military bases). Each mission may include multiple types of restrictions. For example, restrictions may be set on per segment (waypoint to waypoint) or within a defined area, according to a set of geo-coordinates.

In addition to area restrictions (areas on the ground where the aircraft may not operate at any height) there may also be volume restrictions. Consider the case of a water tower-a wide cylinder on top of a narrow pole. The UAV may operate directly beneath the cylinder to get close-up images of the pole, but may need to move further out once reaching the height of the cylinder. The cylinder, along with some buffer, may be defined as a restricted volume while the pole, along with some buffer, may be defined as a restricted area. In another example, pole may also be defined as a volume also, to enable the UAV to operate above the cylinder, directly centered, to image the top of the cylinder.

In addition to those physical restrictions identified above, flight restrictions 222 may identify payload restrictions. Payload restrictions may be for either image or non-image sensors. For example, a location may restrict the use of lasers or put a megapixel restriction on the size of captured images.

Payload sensor settings 224 and payload sampling locations 226 may identify where and how different onboard sensors are to be used during a mission. For example, for an optical sensor, payload settings 224 and payload sampling locations 226 may identify what and how pictures are to be taken during a flight plan. Payload sampling locations 226 may be based on waypoints 216 or may be separate. Payload settings 224 may identify, for an image location, exposure mode, exposure, focal length, shutter speed, aperture, gain (i.e. ISO) for taking a picture. In some examples, an image location may be a segment of a flight plan and payload settings 224 may identify the number of pictures/length of video to take during the segment. Payload 224 may also identify the angle of an image sensor such for image capture. Images may be static or may be captured as a video file.

Locations 228 may identify one or more locations that are associated with a mission (e.g., starting point, asset locations, etc.). A location may be expressed as a set geo-coordinates, city, business name, etc. Locations 228 may be used by controller 102 to determine a set of possible missions for a UAV-discussed further below.

Figure 3:
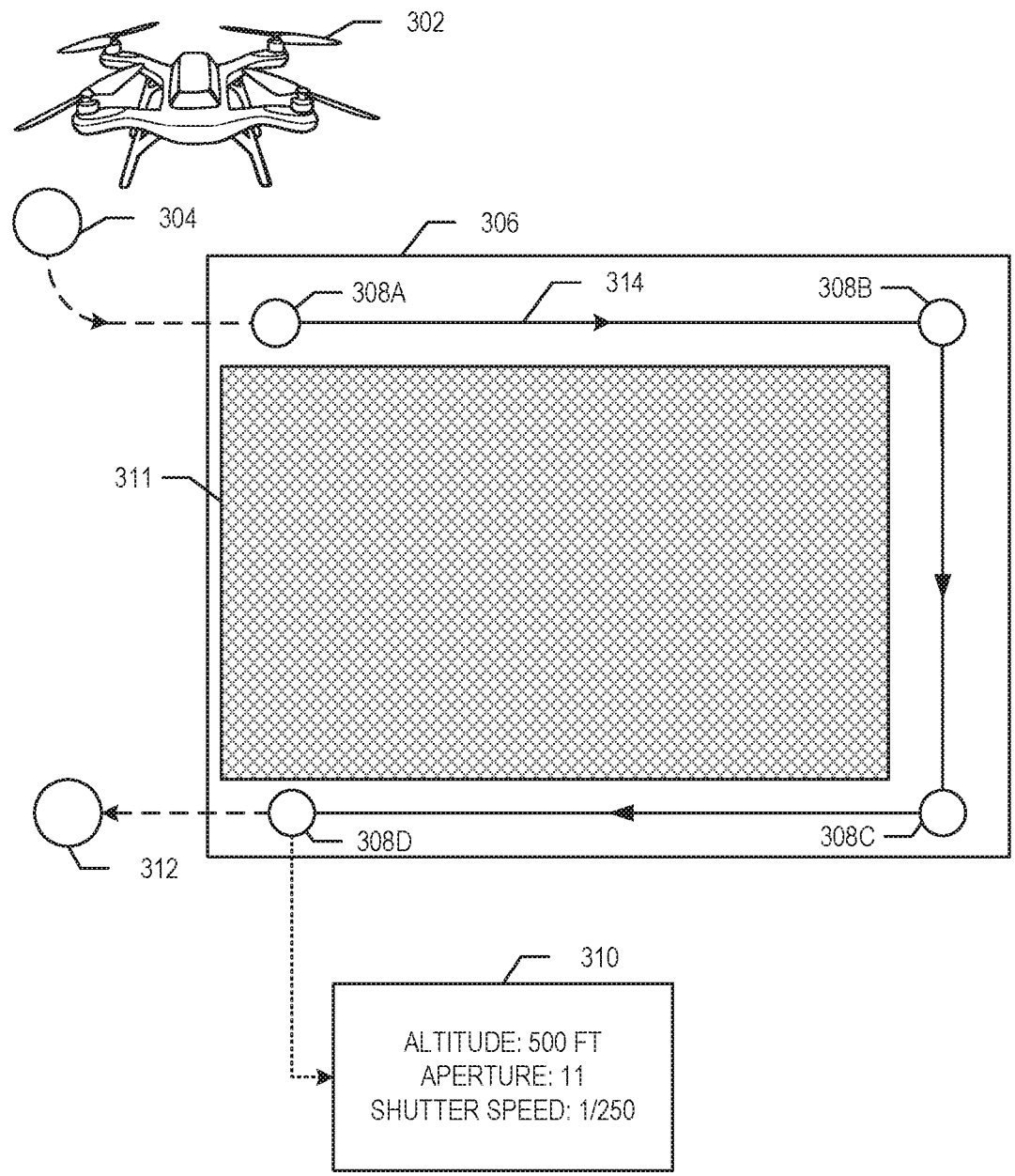
FIG. 3 illustrates a visualization of a mission plan, according to various examples.

FIG. 3 illustrates a visualization of a mission plan, according to various examples. The mission plan includes UAV 302, starting point 304, flight area 306, waypoints 308A, 308B, 308C, 308D, waypoint parameters 310, restricted area 311, end point 312, and flight path 314. The mission plan may be stored as a file in a database on a controller or another external device.

The mission plan illustrated in FIG. 3 may be flown autonomously or semi-autonomously. For example, a user may use a controller to fly to each waypoint-being guided using a display device of the controller. If the user tries to enter restricted area 311, UAV 302 may override the user's command.

UAV 302 may execute the mission plan by receiving the mission plan in its entirety or have it streamed as the mission progresses. For example, a controller may transmit the flight restrictions and the location of the first waypoint. Upon arriving at the first waypoint. UAV 302 may request the next waypoint, and so forth.

As illustrated, flight path 314 take UAV 302 around restricted area 311 to waypoint 308D. At waypoint 308D, the mission plan instructs UAV 302 to take a picture at an altitude of 500 ft., an aperture setting of f/11, and shutter speed of 1/250. Finally, UAV 302 is to navigate to end point 312.

With reference back to FIG. 2, mission selection component 208 may be used to generate a set of possible mission plans for a UAV. A mission selection UI may be presented to the user with the resulting generated set. The mission selection UI may be part of a program used to control a UAV, a downloaded application, or a web-based application, in various examples. Generating may include retrieving one or more mission plans from a database based on a set of criteria. The criteria may include, but is not limited to, location information, user preferences (e.g., user preferences 210), and UAV capabilities.

The mission selection UI may include user input elements such as drop-down menus, text fields, etc., to enter in the criteria. For example, there may be an input field for the search radius. Another input element may select a date range. The date range may refer to the last time a mission was flown. Accordingly, if multiple missions have been flown at the same location, the missions may be filtered to display the missions from the last year, for example. Another criteria may an asset class. For example, a user may select "radio towers" from a drop-down menu to find missions that have been flown in a location for radio tower inspections.

Location information may include the current location of a UAV. The location may be determined using an onboard GPS sensor or the UAV or inferred from a GPS sensor on the controller. In some instances, a user may enter in a location such as a place (e.g., John's farm), GPS coordinates, city names to be used for the location information.

Mission selection component 208 may include a two-part process that first uses the location information to generate an initial set of possible mission plans-using a stored user preference radius or default radius. Then, the UI may display filtering criteria as discussed previously to filter the presented mission plan(s).

The initial set of possible mission plans may also be generated using UAV capabilities to filter out mission plans that a UAV may not be capable of performing. A model type of the UAV or types of onboard sensors (e.g., UAV capabilities) may be communicated from a UAV to a controller-using their respective network interfaces—to facilitate the filtering. This information may be compared to mission parameters for stored mission plans (e.g., UAV requirements 218). If the UAV requirements indicate a sensor type that is not present onboard the UAV, the mission plan may be filtered out before presentation to a user.

Figure 4:
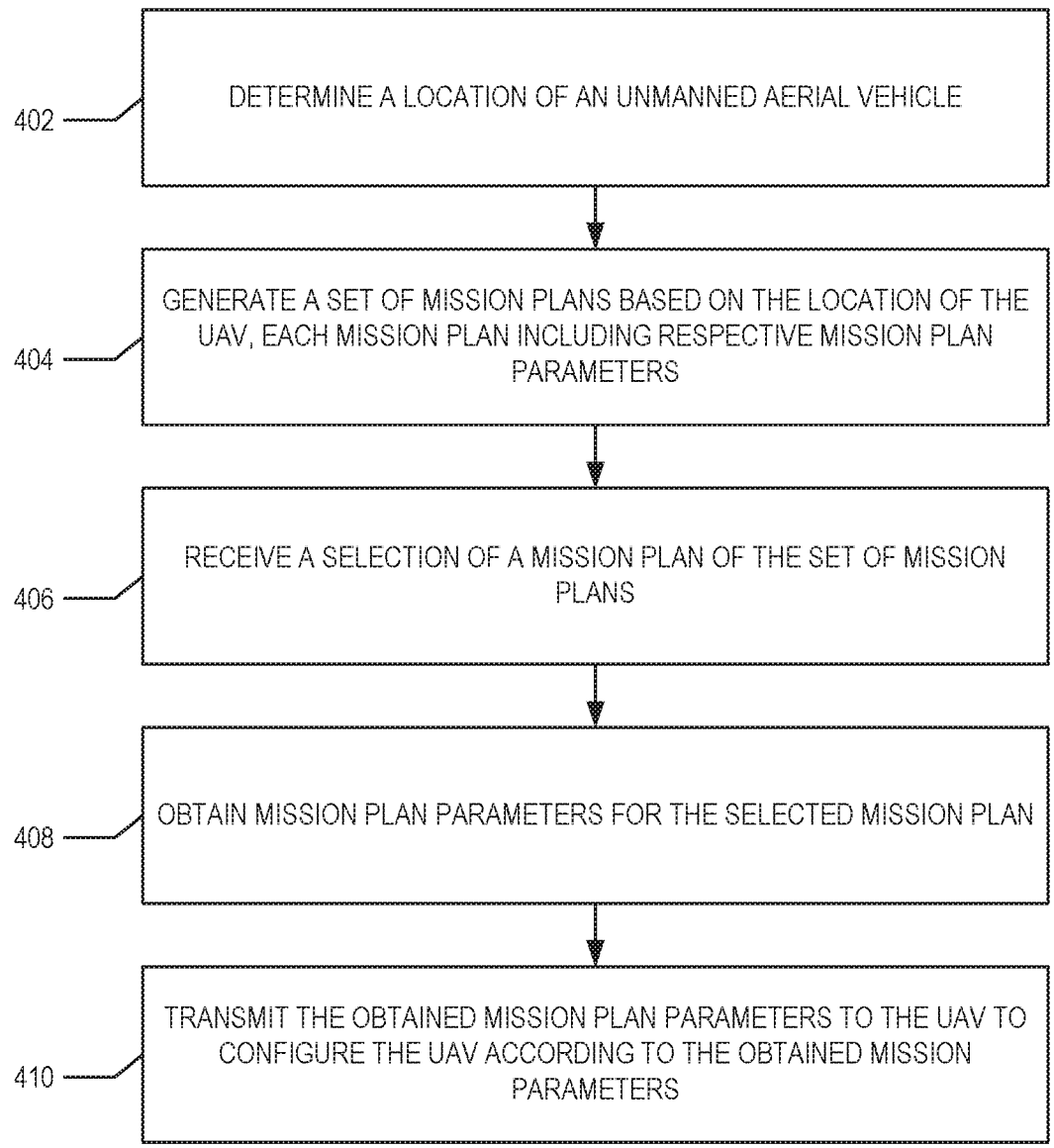
FIG. 4 is a flowchart illustrating a method for generating a set of mission plans, according to various examples.

FIG. 4 is a flowchart illustrating a method for generating a set of mission plans, according to various examples. The method may be embodied in a set of instructions stored in at least one non-transitory storage device of a computing device(s). The computing device(s) may have one or more processors that execute the set of instructions to configure the one or more processors to perform the operations illustrated in FIG. 4. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 402, a location of an unmanned aerial vehicle (UAV) may be determined. In an example, the operations of FIG. 4 are performed on a controller that is used to send data and receive data from the UAV. The data may include control signals (e.g., increase speed, decrease height) and mission parameters. The controller and UAV may communicate via their respective network interfaces. In some examples, the controller is located in a different geographic region than the UAV. For example, a central controller may be control multiple UAVs in different locations. In an example, a controller communicates with external sources to obtain mission plan data.

The location may be based on receiving sensor data originating from the UAV (e.g., a GPS sensor). In an example, determining a location of an unmanned aerial vehicle (UAV) includes using a location of a controller of the UAV. Thus, the location of the UAV is inferred based on the location of the controller—with assumption that the controller is proximate to the UAV. The UAV's location may also be determined using Wi-Fi, mobile device location services, terrestrial positioning services, or manual survey.

At operation 404, a set of mission plans may be generated based on the location of the UAV. Each mission plan may include respective mission plan parameters. Generating may include accessing a data store of possible mission plans and filtering the possible mission plans based on the location (e.g., retrieving mission plans of missions previously stored for the location). The mission plans may be stored in a standardized format (e.g., XML) to allow for faster searching. There may be defined portions of a mission plan that identify a title of the plan, when the mission plan was last flown, a starting point, an ending point, etc. The data store may be located on a controller of the UAV or an external data source may be accessed via the controller.

The data store may be populated by mission plans that have previously been completed by a UAV or plans that have not yet been completed, but have been generated by a user and associated with a location. For example, the user may plan out waypoints and actions take for different payload sensors, etc. Then, when the same or a different user arrives at the location, the newly generated plan may be shown to the user as option to perform-along with potentially other mission pans that are associated with the location. In some examples, mission plan parameters are not determined until after a user has performed an inspection of an asset. In other words, the location, speeds, camera settings, of an inspection performed manually, semi-autonomously, or autonomously, may be stored as mission plan parameters for future use in semi-autonomous or autonomous inspections. The mission plan may be stored as associated with a location(s) (e.g., take-off point, asset locations, etc.). An option may be presented to a user to label and modify the mission parameters. In this manner, the mission plan may be flown in the same way, automatically, when the same or a different user arrives at the location. Accordingly, generating in operation 404 may include retrieving mission plans previously performed by the same or different UAV at the location of the UAV.

Filtering may be based, on for example, a threshold distance from the location of the UAV and a respective starting point of a mission plan as a filter. Accordingly, a corpus of mission plans may be searched to find mission plans that are within the threshold distance of the UAV. As discussed previously, a mission plan may have one or more stored locations that may be stored as mission parameters.

At operation 406, a selection may be received of a mission plan of the set of mission plans. After the set of mission plan is generated at operation 404, the set may be presented to a user. Presenting may include displaying a list of mission plans and some or all of the mission parameters for each mission plan. A user may select a mission plan (e.g., using an input device). In some examples, there may only be one mission plan presented. The user may still confirm the mission plan is to be flown in such an instance.

At operation 408, mission plan parameters for the selected mission plan may be obtained. The mission plan parameters may identify UAV capabilities that are required to perform the mission. The possible mission plans may be further filtered based on capabilities of the UAV in comparison to the required capabilities of respective mission plan parameters. For example, the controller may send a payload request to the UAV to determine which sensors the UAV has onboard. If a mission plan requires a sensor with capabilities that the UAV does not possess, the mission plan may be excluded from the list before presentation to the user.

In some examples, the current time is used to exclude some mission plans. Certain locations may have restrictions on when a UAV may be flown. These restrictions may be stored as part of the mission plan or stored separately. Thus, if the length of the time of the mission plan-as stored in the mission parameters-means the UAV will be flying during the restricted time, that mission plan may be excluded from the generated set.

In various examples, the presented list may be filtered according to previously defined user preferences—or in real-time using user interface elements. For example, the list may include the assets that are relevant (e.g., inspected) during the mission plan. The user may filter out certain asset types to narrow the list.

At operation 410, the obtained mission plan parameters may be transmitted to the UAV to configure the UAV according to the obtained mission parameters. The obtained mission parameters may include a restricted area in which the UAV does not have permission to navigate. The mission parameters may include a set of waypoints for the UAV to navigate through. The mission plan parameters may be transmitted in a format according to the type of UAV. For example, different manufacturers may use different formats. Accordingly, the controller may reformat the mission plan to a compatible format for the UAV.

In some examples, the controller does not transmit all the mission plan parameters. Instead, the controller may transmit instructions to the UAV to perform the operations identified in the mission plan in real-time. Thus, the controller may transmit a command to go to a certain location and take a picture. After the sensors of the UAV indicate the picture has been taken, the controller may send another command according to the mission plan parameters.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
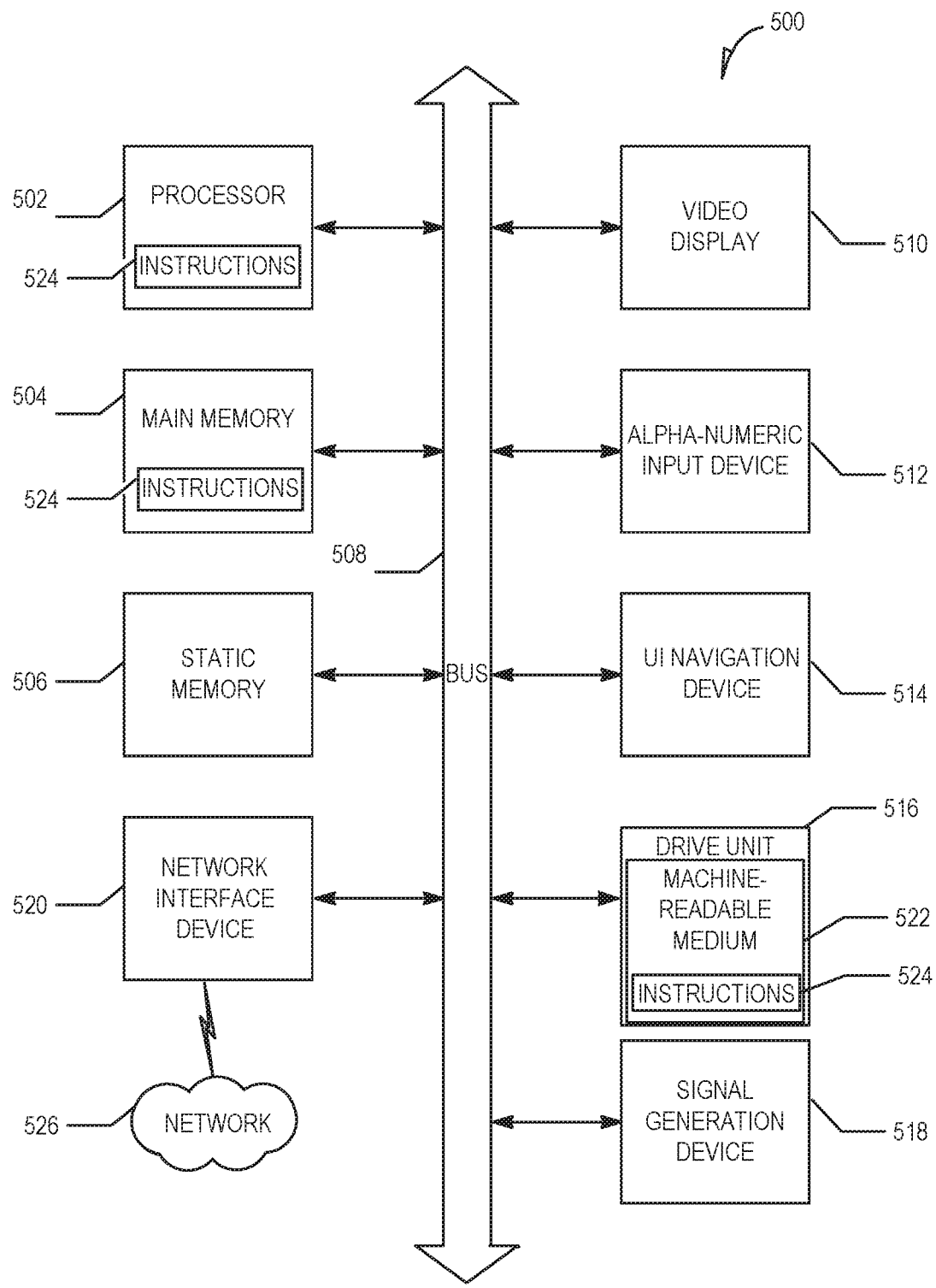
FIG. 5 is a block diagram illustrating an example machine upon which any one or more of the techniques (e.g., methodologies) discussed herein may be performed, according to various examples.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a bus 508 (e.g., link). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   determining a location of an unmanned aerial vehicle (UAV); at a location separate from the UAV, generating a set of two or more mission plans based on the location of the UAV, the mission plans are obtained from a plurality of stored possible mission plans, each stored possible mission plan including respective mission plan parameters, the mission plan parameters including flight plan data used by the UAV for navigation;
   receiving a user selection of a mission plan from the set of two or more mission plans; obtaining the mission plan parameters including the flight plan data for the selected mission plan;
   transmitting the obtained mission plan parameters including the flight plan data from a location separate from the UAV to the UAV to configure the UAV according to the obtained mission plan parameters including the flight plan data;
   wherein generating the set of two or more mission plans based on the location of the UAV comprises:
   accessing a data store containing the stored possible mission plans;
   filtering the stored possible mission plans based on the location; and
   wherein filtering the stored possible mission plans based on the location includes using a threshold distance from the location of the UAV and a respective starting point of a mission plan as a filter.

2. The method of claim 1, wherein determining the location of the UAV is based on receiving sensor data originating from the UAV.

3. The method of claim 1, wherein determining the location of the UAV includes using a location of a controller of the UAV.

4. The method of claim 1, wherein generating the set of two or more mission plans includes retrieving stored possible mission plans of missions previously performed at the location.

5. The method of claim 1, wherein the flight plan data includes a restricted area or volume in which the UAV does not have permission to navigate.

6. The method of claim 1, wherein the flight plan data includes a set of waypoints for the UAV to navigate through.

7. A non-transitory computer-readable medium comprising instructions, which when executed by at least one processor, configure the at least processor to perform operations comprising:
   determining a location of an unmanned aerial vehicle (UAV);
   at a location separate from the UAV, generating a set of two or more mission plans based on the location of the UAV, the mission plans are obtained from a plurality of stored possible mission plans, each stored possible mission plan including respective mission plan parameters, the mission plan parameters include flight plan data used by the UAV for navigation; receiving a user selection of a mission plan from the set of two or more mission plans; obtaining the mission plan parameters including the flight plan data for the selected mission plan;

transmitting the obtained mission plan parameters including the flight plan data from a location separate from the UAV to the UAV to configure the UAV according to the obtained mission plan parameters including the flight plan data;

wherein generating the set of two or more mission plans based on the location of the UAV comprises:

accessing a data store containing the stored possible mission plans; and filtering the stored possible mission plans based on the location; and wherein filtering the stored possible mission plans based on the location includes using a threshold distance from the location of the UAV and a respective starting point of a mission plan as a filter.

8. The non-transitory computer-readable medium of claim 7, wherein determining the location of the UAV is based on receiving sensor data originating from the UAV.

9. The non-transitory computer-readable medium of claim 7, wherein determining the location of the UAV includes using a location of a controller of the UAV.

10. The non-transitory computer-readable medium of claim 7, wherein generating the set of two or more mission plans includes retrieving stored possible mission plans of missions previously performed at the location.

11. The non-transitory computer-readable medium of claim 7, wherein the flight plan data includes a restricted area or volume in which the UAV does not have permission to navigate.

12. The non-transitory computer-readable medium of claim 7, wherein the flight plan data includes a set of waypoints for the UAV to navigate through.

13. A system comprising: at least one processor;

a storage device comprising instructions, which when executed by the at least one processor, configure the at least processor to perform operations comprising:

determining a location of an unmanned aerial vehicle (UAV);

at a location separate from the UAV, generating a set of two or more mission plans based on the location of the UAV, the mission plans are obtained from a plurality of stored possible mission plans, each stored possible mission plan including respective mission plan parameters, the mission plan parameters include flight plan data used by the UAV for navigation;

receiving a user selection of a mission plan from the set of two or more mission plans;

obtaining the mission plan parameters including the flight plan data for the selected mission plan; and transmitting the obtained mission plan parameters including the flight plan data from a location separate from the UAV to the UAV to configure the UAV according to the obtained mission plan parameters including the flight plan data;

wherein generating the set of two or more mission plans based on the location of the UAV comprises:

accessing a data store containing the stored possible mission plans; and filtering the stored possible mission plans based on the location; and wherein filtering the stored possible mission plans based on the location includes using a threshold distance from the location of the UAV and a respective starting point of a mission plan as a filter.

14. The system of claim 13, wherein determining the location of the UAV is based on receiving sensor data originating from the UAV.

15. The method of claim 1, wherein mission plan parameters include required UAV capabilities to perform the mission, and further comprising filtering the stored possible mission plans based on capabilities of the UAV in comparison to the required UAV capabilities of respective mission plan parameters.

16. The non-transitory computer-readable medium of claim 7, wherein mission plan parameters include required UAV capabilities to perform the mission, and further comprising filtering the stored possible mission plans based on capabilities of the UAV in comparison to the required UAV capabilities of respective mission plan parameters.

* * * * *